United States Patent
Hong

(10) Patent No.: US 12,470,965 B2
(45) Date of Patent: Nov. 11, 2025

(54) METHOD FOR PROCESSING OVERHEAT OF THE UE COMMUNICATION DEVICE, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 382 days.

(21) Appl. No.: 18/011,170

(22) PCT Filed: Jun. 19, 2020

(86) PCT No.: PCT/CN2020/097209
§ 371 (c)(1),
(2) Date: Dec. 17, 2022

(87) PCT Pub. No.: WO2021/253434
PCT Pub. Date: Dec. 23, 2021

(65) Prior Publication Data
US 2023/0247464 A1 Aug. 3, 2023

(51) Int. Cl.
*H04W 4/00* (2018.01)
*H04W 24/10* (2009.01)
*H04W 76/20* (2018.01)

(52) U.S. Cl.
CPC ........... *H04W 24/10* (2013.01); *H04W 76/20* (2018.02)

(58) Field of Classification Search
CPC .................................................. H04W 24/10
See application file for complete search history.

(56) References Cited

U.S. PATENT DOCUMENTS

| 2009/0215442 | A1 | 8/2009 | Lindoff et al. |
| 2012/0064909 | A1 | 3/2012 | Lindoff et al. |
| 2014/0128057 | A1* | 5/2014 | Siomina ............... H04W 56/00 455/423 |
| 2020/0008145 | A1 | 1/2020 | Tang et al. |
| 2020/0077361 | A1* | 3/2020 | Huang ............... H04L 65/1063 |

(Continued)

FOREIGN PATENT DOCUMENTS

| CN | 102740327 A | 10/2012 |
| CN | 102752787 A | 10/2012 |

(Continued)

OTHER PUBLICATIONS

International Searching Authority, English Translation of the Written Opinion of the International Searching Authority PCT/CN2020/097209, WIPO, pp. 1-3. (Year: 2021).*

(Continued)

*Primary Examiner* — Elisabeth Benoit Magloire
(74) *Attorney, Agent, or Firm* — Arch & Lake LLP; Hao Tan; Shen Wang

(57) ABSTRACT

The present disclosure provides a method for processing overheat of UE performed by a base station. The method for processing overheat of UE includes the following steps: sending by the base station, to a user equipment in a connected state, thermal measurement configuration, where the thermal measurement configuration is configured to trigger, while the user equipment is in an idle state or an inactive state, the user equipment to measure a temperature within the user equipment.

19 Claims, 4 Drawing Sheets

(56) References Cited

U.S. PATENT DOCUMENTS

| | | | | |
|---|---|---|---|---|
| 2022/0272560 A1* | 8/2022 | Hong | .................... | H04W 24/10 |
| 2022/0338037 A1* | 10/2022 | Jiang | .................... | H04J 11/0023 |
| 2023/0071803 A1* | 3/2023 | Liu | ........................ | H04W 24/08 |
| 2023/0077269 A1* | 3/2023 | Liu | .................... | H04W 74/0833 |
| 2023/0354059 A1* | 11/2023 | Hong | .................... | H04W 24/10 |

FOREIGN PATENT DOCUMENTS

| | | | |
|---|---|---|---|
| CN | 102752789 A | | 10/2012 |
| CN | 104602282 A | | 5/2015 |
| CN | 107466457 A | | 12/2017 |
| CN | 110710248 A | | 1/2020 |
| CN | 111107594 A | | 5/2020 |
| CN | 111278097 A | | 6/2020 |
| WO | 2019191894 A1 | | 10/2019 |

OTHER PUBLICATIONS

International Search Report issued in Application No. PCT/CN2020/097209 dated Mar. 17, 2021, (4p).

\* cited by examiner

METHOD FOR PROCESSING OVERHEAT OF THE UE COMMUNICATION DEVICE, AND STORAGE MEDIUM

CROSS-REFERENCE TO RELATED APPLICATION

The present application is a U.S. National Stage of International Application No. PCT/CN2020/097209, filed on Jun. 19, 2020, the contents of all of which are incorporated herein by reference in their entireties for all purposes.

BACKGROUND

With the development of mobile communication technologies, users have increasingly high requirements for transmission rate. High transmission rate is usually accompanied by high operating frequency, leading to overheating of user equipment (UE).

SUMMARY

The disclosure relates to, but is not limited to, the field of wireless communication, and in particular to an information processing method and apparatus, a communication device, and a storage medium.

According to a first aspect of the disclosure, there is provided an information processing method, including: sending, to a user equipment (UE) in a connected state, thermal measurement configuration, where the thermal measurement configuration is configured to trigger, while the UE is in an idle state or an inactive state, the UE to measure a temperature within the UE.

According to a second aspect of the disclosure, there is provided an information processing method, including: receiving thermal measurement configuration in a connected state, where the thermal measurement configuration is configured to trigger, while the UE is in an idle state or an inactive state, a UE to measure a temperature within the UE.

According to a third aspect of the disclosure, there is provided an information processing apparatus, including: a sending module, configured to send, to a user equipment (UE) in a connected state, thermal measurement configuration, where the thermal measurement configuration is configured to trigger, while the UE is in an idle state or an inactive state, the UE to measure a temperature within the UE.

According to a fourth aspect of the disclosure, there is provided an information processing apparatus, including: a receiving module, configured to receive thermal measurement configuration in a connected state, where the thermal measurement configuration is configured to trigger, while a UE is in an idle state or an inactive state, the UE to measure a temperature within the UE.

According to a fifth aspect of the disclosure, there is provided a communication device, including a processor, a transceiver, a memory, and executable programs. The executable programs are stored in the memory and can be executed by the processor. While executing the executable programs, the processor performs the information processing method according to the first aspect or the second aspect.

According to a sixth aspect of the disclosure, there is provided a non-transitory computer storage medium storing executable programs. While the executable programs are executed by a processor, the information processing method according to the first aspect or the second aspect can be implemented.

BRIEF DESCRIPTION OF THE DRAWINGS

The accompanying drawings are incorporated into the specification and constitute a part of the specification, illustrate examples consistent with the present disclosure, and are used to explain the principle of the disclosure together with the specification.

DETAILED DESCRIPTION

Examples will be described in detail, and instances of the examples are illustrated in the accompanying drawings. In the case that the following descriptions refer to the figures, the same numbers in different figures indicate the same or similar elements, unless otherwise indicated. Implementations described in the following examples do not represent all implementations consistent with the examples of the present disclosure. Instead, they are instances of devices and methods consistent with some aspects of the examples of the present disclosure.

The terms used in the examples of the present disclosure are for the purpose of describing examples, and are not intended to limit the examples of the present disclosure. The terms "a/an", and "the" in the singular form used in the examples of the present disclosure and the appended claims are also intended to include the plural form, unless otherwise clearly indicated in the context. It should be further understood that the term "and/or" used in the present disclosure refers to and includes any or all possible combinations of one or more of the associated listed items.

It should be understood that although the terms 'first', "second", "third", etc. may be used in the examples of the present disclosure to describe various information, the information should not be limited to these terms. These terms are used to distinguish the same type of information from one another. For example, without departing from the scope of the examples of the present disclosure, the first information may also be referred to as second information, and similarly, the second information may also be referred to as first information. Depending on the context, the word "if" and "in case" as used in the present disclosure may be interpreted as "when" or "upon" or "in response to determining".

To better describe any examples of the present disclosure, an example of the present disclosure takes an application scenario of an intelligent control system for electricity meter as an example.

Figure 1:
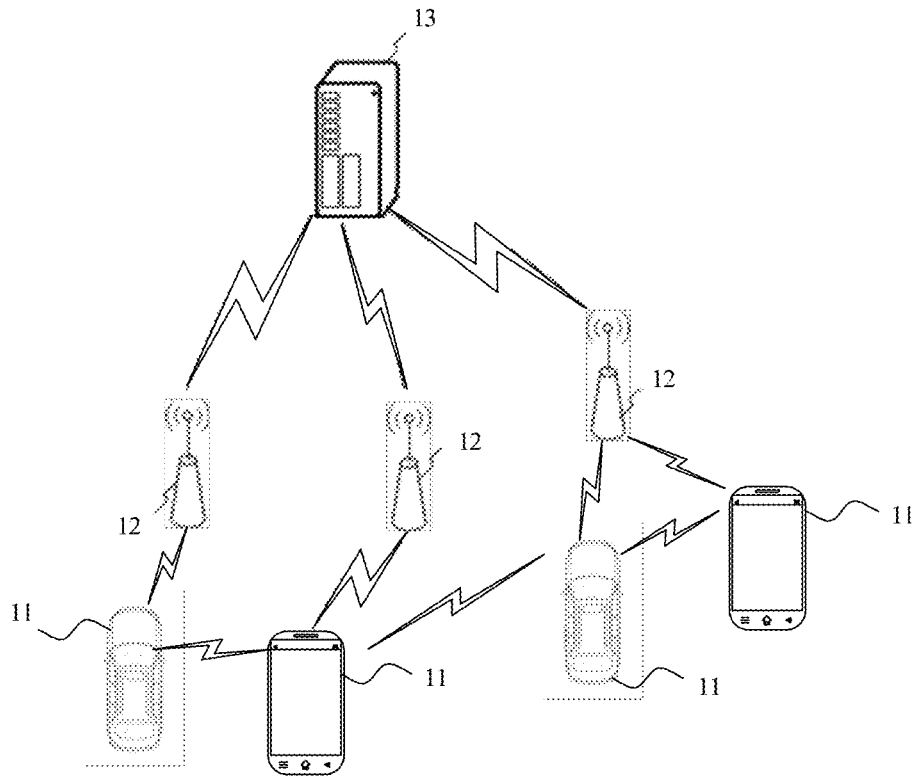
FIG. 1 is a schematic structural diagram of a wireless communication system according to an example.

Referring to FIG. 1, FIG. 1 shows a schematic structural diagram of a wireless communication system according to an example of the present disclosure. As shown in FIG. 1, the wireless communication system is a communication system based on a cellular mobile communication technology and may include more than one terminal 11 and more than one base station 12.

The terminal 11 may refer to a device for providing voice and/or data connectivity for a user. The terminal 11 may be in communication with one or more core networks via a radio access network (RAN). The terminal 11 may be an Internet of Things terminal, such as a sensor device, a mobile phone (or "cellular" phone), and a computer having the Internet of Things terminal, for example, may be a fixed, portable, pocket, handheld, computer built-in, or vehicle-mounted device. For example, the terminal 11 may be a station (STA), a subscriber unit, a subscriber station, a mobile station, a mobile, a remote station, an access point, a remote terminal, an access terminal, a user equipment, a user agent, a user device, or a user terminal. Alternatively, the terminal 11 may also be an unmanned aerial vehicle. Alternatively, the terminal 11 may also be a vehicle-mounted device, for example, may be a trip computer with a wireless communication function, or may be a wireless terminal connected to the trip computer externally. Alternatively, the terminal 11 may also be a roadside device, for example, may be a street lamp, a signal light, or other roadside devices with the wireless communication function.

The base station 12 may be a network-side device in the wireless communication system. The wireless communication system may be a 4th generation mobile communication (4G) system, also referred to as a long term evolution (LTE) system. Alternatively, the wireless communication system may also be a 5G system, also referred to as a new radio (NR) system or a 5G NR system. Alternatively, the wireless communication system may also be a next generation system of the 5G system. An access network in the 5G system may be referred to as a new generation-radio access network (NG-RAN).

The base station 12 may be an evolved base station (eNB) adopted in the 4G system. Alternatively, the base station 12 may also be a base station using a centralized-distributed architecture (gNB) in the 5G system. In the case that the base station 12 uses the centralized-distributed architecture, a central unit (CU) and at least two distributed units (DU) are included usually. The central unit is provided with protocol stacks of a packet data convergence protocol (PDCP) layer, a radio link control (RLC) protocol layer, and a media access control (MAC) layer. The distributed unit is provided with a protocol stack of a physical (PHY) layer. The disclosure does not limit the implementations of the base station 12.

Wireless connection between the base station 12 and the terminal 11 may be established by means of a radio air interface. In different implementations, the radio air interface is a radio air interface based on the 4th generation mobile communication network technology (4G) standard, or the radio air interface is a radio air interface based on the 5th generation mobile communication network technology (5G) standard, for example, the radio air interface is a new radio; or the radio air interface may also be a radio air interface based on a further next generation mobile communication network technology standard of 5G.

In some examples, end to end (E2E) connection may be established between the terminals 11, for example, vehicle-to-vehicle (V2V) communication, vehicle-to-infrastructure (V2I) communication, and vehicle-to-pedestrian (V2P) communication and the like in vehicle-to-everything (V2X) communication.

In some examples, the wireless communication system further includes a network management device 13.

Several base stations 12 are connected with the network management device 13 respectively. The network management device 13 may be a core network device in the wireless communication system. For example, the network management device 13 may be a mobility management entity (MME) in an evolved packet core (EPC) network. Alternatively, the network management device may be other core network devices, such as a serving gateway (SGW), a public data network gateway (PGW), a policy and charging rules function (PCRF) unit, or a home subscriber server (HSS). The disclosure does not limit the implementations of the network management device 13.

With the development of mobile communication technologies, users have increasingly high requirements for transmission rate. High transmission rate is usually accompanied by high operating frequency, leading to overheating of user equipment (UE). In the case that the UE overheats for a long time or frequently, on the one hand, hardware of the UE will be damaged, and usage life of the UE will be shortened, and on the other hand, thermal protection of the UE may be started, and phenomena such as downtime or automatic restart may occur. However, the downtime and the automatic restart may lead to service interruption of the UE, greatly degrading the user experience.

Figure 2:
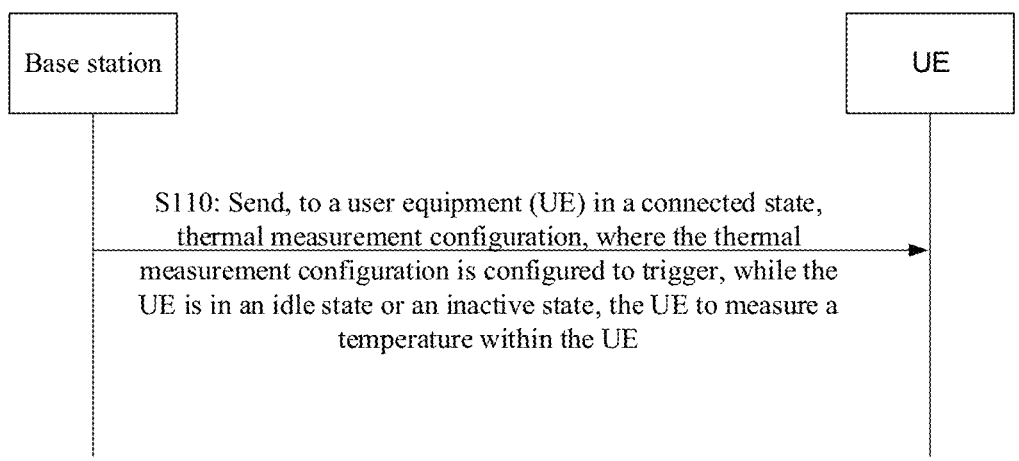
FIG. 2 is a schematic flowchart of an information processing method according to an example.

As shown in FIG. 2, there is provided an information processing method according to an example of the present disclosure. The information processing method includes step S110.

Step S110 includes sending, to a user equipment (UE) in a connected state, thermal measurement configuration, where the thermal measurement configuration is configured to trigger, while the UE is in an idle state or an inactive state, the UE to measure a temperature within the UE.

The information processing method according to an example of the present disclosure may be performed by a base station.

The UE may be in different states, such as a connected state, an inactive state, an idle state and the like. In different states, connection states between the UE and a network are different. The connected state in the present disclosure is the abbreviation of an RRC connected state. The inactive state in the present disclosure is the abbreviation of an RRC inactive state. In the idle state, the UE is disconnected from an access network and a core network. In the inactive state, the UE is disconnected from the access network, and this disconnection between the UE and the access network is invisible to the core network.

In an example of the present disclosure, while the UE is in the connected state, the base station may send the thermal measurement configuration to the UE in advance, for triggering the UE or for providing reference to the UE, so as for the UE to measure a temperature of the UE and/or record a measurement result. In this way, after exiting the connected state, the UE may perform measurement based on the thermal measurement configuration.

The thermal measurement configuration is further configured to regulate, after the UE exits the connected state, a measurement behavior of the UE while the UE is in the inactive state or the idle state. In this way, the UE does not need to measure, record, and report while the UE is in the connected state, such that a workload of the UE in the connected state is reduced, further heat generation of the UE in the connected state due to measurement and recording of measurement results is reduced, and power consumption of the UE in the connected state is reduced.

In this way, the UE measures the temperature within the UE based on the thermal measurement configuration sent by the base station, and the UE may perform targeted measurement with reference to the needs of the base station. After the measurement result is reported to the base station, the measurement result may give a reference factor to the wireless communication between the base station and the UE. For example, the base station may determine radio configuration for the UE based on the result of the targeted temperature measurement of the UE, so as to reduce the overheating of the UE caused by the radio configuration of the base station as much as possible.

In some examples, the thermal measurement configuration is one of Minimized Road Test (MDT) configuration. For example, the thermal measurement configuration is present in the UE as the MDT configuration and is configured for the UE to measure and/or record the temperature of the UE subsequently.

In some examples, step S110 may include sending, to the UE in the connected state, radio resource control (RRC) signaling carrying the thermal measurement configuration.

In this example of the present disclosure, the thermal measurement configuration is sent to the UE by means of the RRC signaling, and sending the thermal measurement configuration using the RRC signaling provides high flexibility.

In some examples, the RRC signaling may be Logged Measurement Configuration signaling.

The RRC signaling carries the thermal measurement configuration. In this way, after the UE receives the thermal measurement configuration, the UE may measure the temperature within the UE based on the thermal measurement configuration.

In some examples, the thermal measurement configuration includes at least one of the following:
measurement time information, configured to indicate time for measuring the UE;
recording triggering information, configured to trigger the UE to record the measured temperature;
recording content information, configured to indicate content needing to be recorded by the UE; and
reporting triggering information, configured to trigger the UE to report the recorded information.

The measurement time information is configured to indicate a time period during which the UE performs temperature measurement. The measurement time information may be a time period in days, a time period in half-days, or a time period in weeks. For example, in the case that the measurement time information is the time period in days, a time period from wee hours to 6 a.m. may be determined as the time for the UE to measure the temperature.

In another example, under some conditions, the UE may measure the temperature, but may not record every measured temperature. For example, the UE may record an overheating temperature causing downtime of the UE, or may record a overcooling temperature causing phenomena such as battery power supply. In this case, the recording triggering information may include at least one of a lower limit of a triggering temperature and an upper limit of a triggering temperature. Furthermore, at least one of the following will be performed: the UE starts to record the temperature measured by the UE, in response to the temperature measured by the UE reaching the upper limit of the triggering temperature; and, the UE starts to record the temperature measured by the UE, in response to the temperature measured by the UE reaching the lower limit of the triggering temperature. In this way, the UE is triggered to record only when there is a need for recording, thus reducing the amount of information recorded by the UE, and reducing unnecessary waste of storage resources, electric energy, and/or computing resources.

In some examples, the recording content information indicates information needing to be recorded by the UE. The UE does not need to record all information while the UE overheats or overcools, but only needs to record information related to radio bearer adjustment of the base station.

The recording content information may include type information of information-to-be-recorded.

In some examples, the reporting triggering information may be indication information triggering the UE to actively report the recording information. For example, the reporting triggering information may indicate the UE to report, in response to a data threshold of the recording information reaching a quantity threshold, and in this case, the reporting triggering information may include the quantity threshold. For another example, the reporting triggering information may further indicate the UE to report the recording information, in response to the number of temperature abnormalities of the UE reaching a time threshold since an end time of last reporting of the recording information, where the number of temperature abnormalities includes at least one of the number of temperature overheating and the number of temperature overcooling. In this case, the reporting triggering information may include the time threshold.

In some examples, the reporting triggering information may further include triggering event information. For example, the UE is triggered to report the recording information, in response to detecting that a difference between the temperature of the UE and a historical temperature causing UE downtime is less than a difference threshold.

In an example, the type information of the information-to-be-recorded includes, but is not limited to, at least one of the following:
temperature information when the temperature of the UE is abnormal;
reason information causing the temperature abnormalities; and
operating state information of the UE when the temperature is abnormal.

The above are examples for the type information of the information-to-be-recorded, and implementations are not limited thereto.

In some examples, the content included in the thermal measurement configuration is not limited to the above, and may further include:
reporting format information, indicating a format of reporting of the recording information;
reporting signaling information, indicating signaling used by the UE to report the recording information; and
reporting opportunity information, indicating an opportunity of the UE reporting the recording information, for example, reporting during random access, for another example, reporting while RRC connection is established with the base station, and for yet another example, reporting while responding to a paging message.

In some examples, the measurement time information is configured to indicate: start and end time of the measurement; or, start time and duration of the measurement.

For example, the start and end time include start time and end time, for example, 9:00 a.m. to 4:00 p.m. In this case, 9:00 a.m. is the start time, and 4:00 p.m. is the end time.

For example, the start time and duration of the measurement are equivalent to limiting a time period for the measurement similarly. For example, the start time is 0:00 a.m., the duration is six hours, and the time period during which the UE may measure is a time period from wee hours to 6:00 a.m.

In some examples, the measurement time information may further be configured to indicate duration and end time.

In some examples, the measurement time information is further configured to indicate a measurement cycle and the number of lasting cycles. For example, one measurement cycle is one hour, and three cycles are indicated, then three hours are lasted. The start time may be time of occurrence of the measurement triggering event. In response to detecting that transmission interruption or stucking occurs on the UE or a specific application (e.g., a game application) is started, time when these events occur is considered as the start time of the measurement.

In a word, in the examples of the present disclosure, the start time may be pre-specified by the thermal measurement configuration, or may be dynamically determined by the triggering event indicated by the thermal measurement configuration.

In some examples, the recording triggering information includes a recording threshold, where the recording threshold is configured to trigger, in response to the measured temperature exceeding the recording threshold, the UE to perform information recording; and the reporting recording information includes a reporting threshold, where the reporting threshold is configured to trigger, in response to the measured temperature exceeding the reporting threshold, the UE to report the recorded information, where the reporting threshold is greater than the recording threshold.

For example, according to the thermal measurement configuration, the UE measures temperatures of one or more positions within the UE and obtains, based on the temperatures of these positions, an average temperature within the UE or a weighted average temperature of these positions. For another example, according to the thermal measurement configuration, the UE may measure temperatures of different positions within the UE and different positions may correspond to different reporting thresholds or different recording thresholds. In this way, as long as the temperature of one position reaches the reporting threshold, it may be determined that a reporting condition is met and the UE has recording information to be reported.

A change in the temperature of the UE is not instantaneous, and there is a time for the temperature to change and there is a certain trend for the temperature to change. By setting the recording threshold to be less than the reporting threshold, recording may be started before the temperature reach the reporting threshold, so as to reduce an omission of the recording while the temperature reaches the reporting threshold.

In some examples, the recording content information is configured to indicate to record at least one of the following:
  moment at which the measured temperature exceeds the recording threshold;
  duration during which the measured temperature exceeds the recording threshold;
  reason why the measured temperature exceeds the recording threshold;
  business service provided by the UE while the measured temperature exceeds the recording threshold;
  cell where the UE resides in while the measured temperature exceeds the recording threshold; and
  radio access technology (RAT) that the UE resides while the measured temperature exceeds the recording threshold.

For example, the UE may monitor its own temperature periodically or in real time, and may record every measured temperature. However, in some examples, the UE only records the temperatures exceeding the recording threshold. At the same time, the time while the temperature exceeds the recording threshold may be recorded, so as to facilitate calculating out, in time domain, a distribution characteristics of the time while the temperature of the UE exceeds the recording threshold. In this way, the distribution characteristics in the time domain may be considered while radio bearers are allocated subsequently.

In some examples, before the UE detects that the temperature exceeds the recording threshold, the temperature may be detected at a first frequency, and after the UE detects that the temperature exceeds the recording threshold, the temperature may be detected at a second frequency, where the second frequency is higher than the first frequency. A duration for detecting at the second frequency is a duration from the moment at which the detected temperature exceeds the recording temperature to a moment at which the detected temperature becomes lower than the recording threshold. By boosting the frequency of detecting, it is possible to boost the frequency of measurement in response to the UE starting to have an overheating omen, so that the temperature of the UE may be measured accurately and the change in temperature may be timely observed. Measuring at a lower frequency in the case that the temperature of the UE is relatively low may reduce the power consumption and head generation generated by high-frequency measurement.

In some examples, the reason why the temperature exceeds the recording threshold is a reason for overheating or overcooling obtained from analysis of the UE itself. For example, an analysis model for the temperature abnormalities is embedded in the UE. The analysis model may take a currently detected temperature and current state of the UE as an input, and analyze the reason why the temperature of the UE is abnormal by itself. These reasons may be represented by a reason code. For example, the UE launches 20 applications (APPs) while when it is found that the temperature overheats, and the reason code that too many APPs are launched is 1, in this case, the UE may record the reason code "1".

In some cases, certain applications occupy more of memory and computing resources of the UE, and once the applications are launched, it may be found that the temperature of the UE rises rapidly. In this case, business services of the APPs may be recorded, so as to reduce triggering, by a base station, of the UE to perform the business services.

In some examples, the business service provided by the UE may not be related to a certain application. Taking artificial intelligence (AI) service as an example, many applications may provide the AI service, or the AI service is provided at an assisting base station. For some UE, the AI service is a business service with huge consumption indeed. The temperature of the UE is bound to rise sharply while these business services are provided by the UE. The UE may record these business services. The base station may allocate less radio bearers that need the AI service or less schedule the UE to perform the AI service while the base station allocates the radio bearers or performs business scheduling subsequently.

The RAT may relate to a communication standard applied to an access point connected by the UE, for example, GSM, GPRS, UMTS, LTE, CDMA, and/or WiFi, etc. Some UEs may simultaneously use different RATs to access a network. In this case, the RAT causing overheating of the UE may be a certain RAT but not all RATs. In this case, by recording the RATs used during the overheating of the UE, the base station or the UE itself is facilitated to determine, for the overheating of the UE, whether there has a distribution characteristic of the RAT. In the case that there has the distribution characteristic of the RATs, usage frequency of the RAT easily causing the overheating of the UE and the like may be reduced by signaling from the base station and/or by its own configuration in the UE, such that overheating of the UE may be reduced.

Figure 3:
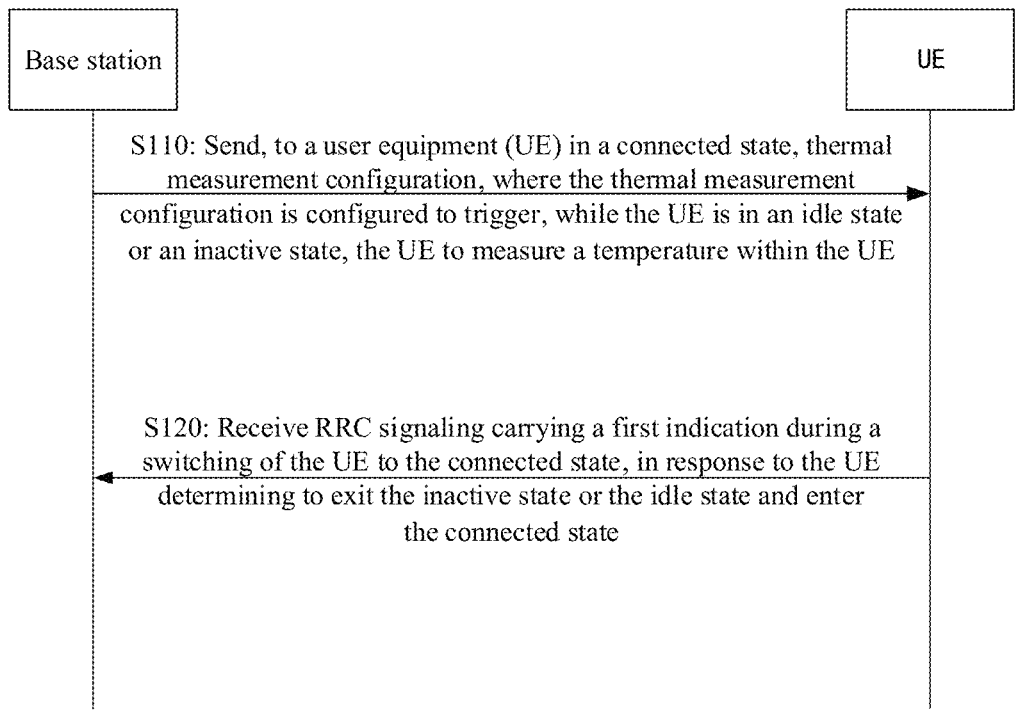
FIG. 3 is a schematic flowchart of an information processing method according to an example.

In some examples, as shown in FIG. 3, the method further includes step S120.

Step S120 includes receiving RRC signaling carrying a first indication during a switching of the UE to the connected state, in response to the UE determining to exit the inactive state or the idle state and enter the connected state, where the first indication is configured to indicate to-be-reported recording information in the UE.

During the UE enters the connected state, the RRC signaling during the UE enters the connected state carries the first indication, so as to tell the base station that there has the to-be-reported recording information. In this way, during the UE connects to the base station, the base station may know that there has the to-be-reported recording information. After the UE is allowed to report timely, the base station may schedule the resources of the UE based on the recording information reported by the UE, such that the temperature abnormalities such as overheating or overcooling generated by the UE is reduced.

In some cases, during the UE resides in a certain cell, the UE may always keep measuring and/or searching for a signal, etc. due to problems such as shielding of a radio signal, leading to overheating of the UE. In this case, the cell where the UE resides in when the temperature reaches the recording threshold may be recorded, so as to facilitate subsequent adjustment of parameters of the cell. For example, after obtaining a large amount of statistic information, an analysis device of an operator or a working staff finds that a large amount of UEs overheats in a certain cell, this indicates that the setting of the parameters of the cell are abnormal and the parameters of the cell may need to be adjusted. For example, an antenna parameter and the like of the cell may be adjusted, to implement network optimization.

For example, the UE is connected to the 4th generation mobile communication (4G) network currently. The RRC signaling includes, but is not limited to, at least one of the following:

RRC Connection Setup Complete signaling;
RRC Connection Reconfiguration Complete signaling;
RRC Connection Reestablishment Complete signaling; and
RRC Connection Resume Complete signaling.

For another example, the UE is connected to the 5th generation mobile communication (5G) network currently. The RRC signaling includes, but is not limited to, at least one of the following:

RRC Setup Complete signaling;
RRC Reconfiguration Complete signaling;
RRC Reestablishment Complete signaling; and
RRC Resume Complete signaling.

The above are examples for the RRC signaling carrying the first indication, and specific implementations are not limited in the disclosure.

In some examples, the first indication may be carried by one or more bits. In the case that the first indication is carried by one bit, whether the UE has the to-be-reported recording information is respectively indicated by two bit values of the one bit. For another example, in the case that the first indication is carried by more than one bit, the more than one bit may indicate quantity information such as the number of bits of first-information-to-be-reported or the number of the recording information, so as to facilitate the base station to know more related content of the to-be-reported recording information in the UE currently.

In an example, the first indication may be carried in a reserved bit of the RRC signaling, or may further be indicated by a sequence of the reserved bits of the RRC signaling.

In another example, an Information Element (IE) is added to the RRC signaling to carry the first indication.

Figure 4:
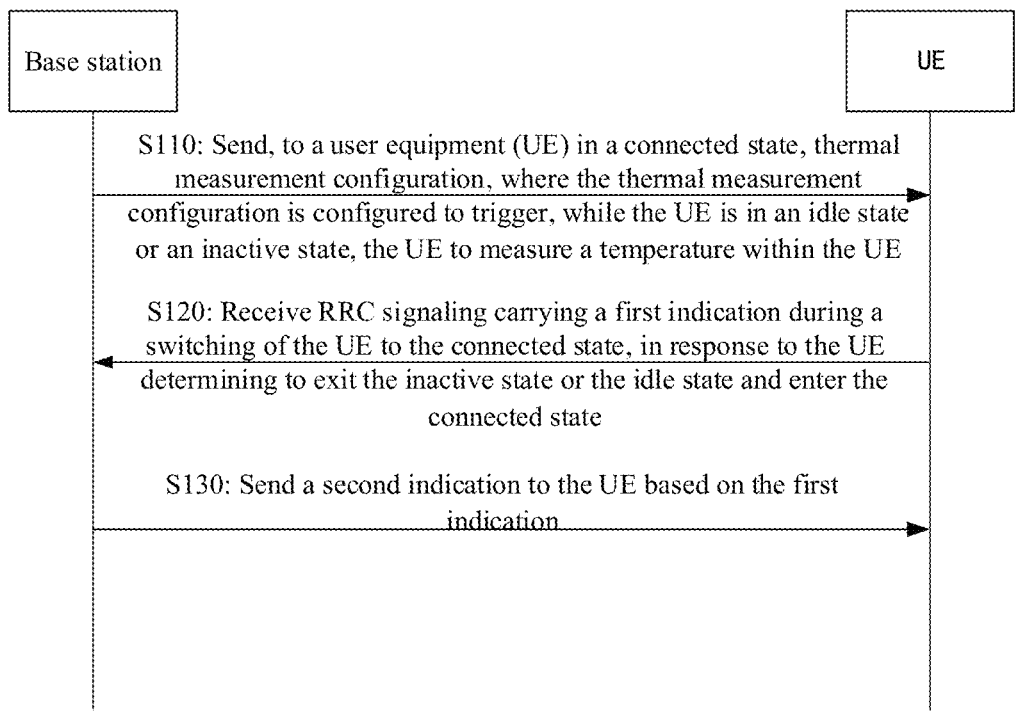
FIG. 4 is a schematic flowchart of an information processing method according to an example.
Figure 5:
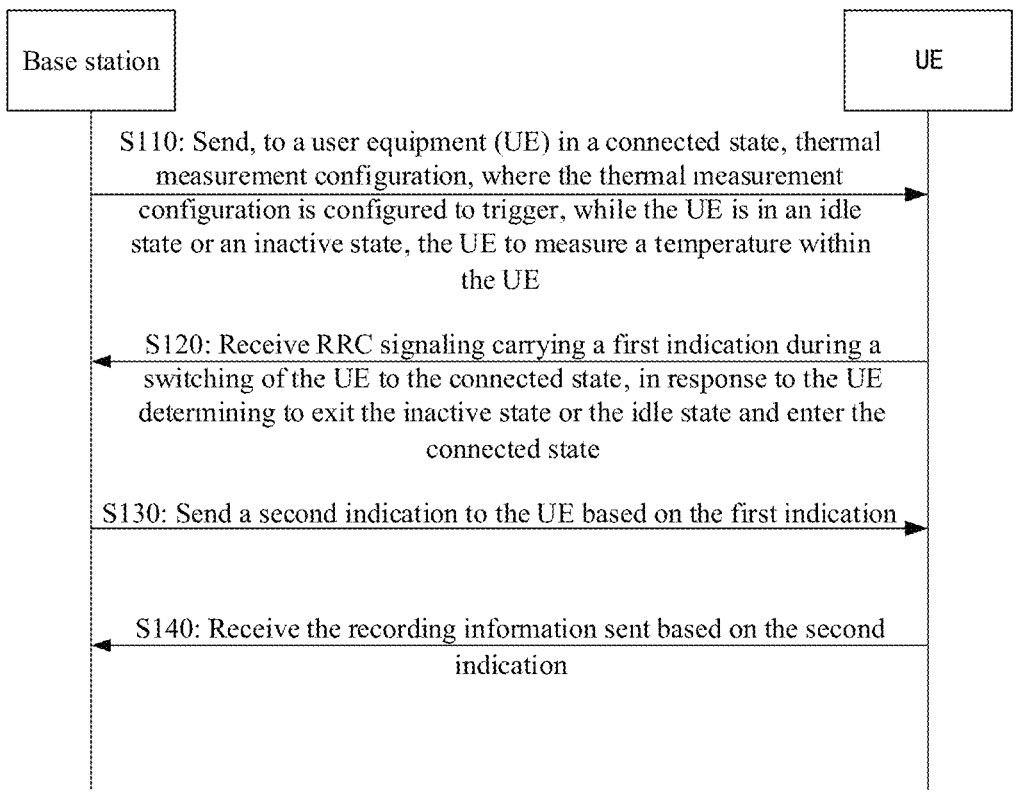
FIG. 5 is a schematic flowchart of an information processing method according to an example.

In some examples, as shown in FIG. 4, the method further includes step S130.

Step S130 includes sending a second indication to the UE based on the first indication, where the second indication is configured to indicate to the UE to report the to-be-reported recording information.

In some examples, after the UE reports the first indication, the base station determines, based on needs of the base station itself, whether to indicate the UE to report or indicate content needing to be reported. In this case, the base station may issue the second indication.

After receiving the first indication, the base station may indicate, during a process of establishing connection with the UE, the UE whether to report or what to report.

For example, the second indication is carried in RRC reconfiguration signaling and RRC resume response etc. sent to the UE by the base station.

In some examples, the base station may carry the second indication by introducing one new RRC signaling during a process of connection resume.

For example, the base station may send the second indication by means of UE InformationRequest signaling.

The above are examples for the RRC signaling carrying the second indication, and specific implementations are not limited in the disclosure.

In some examples, the first indication and/or the second indication is transmitted by means of the RRC signaling. In some other examples, the first indication and/or the second indication may be carried by physical-layer signaling and/or MAC-layer signaling. The physical-layer signaling transmits the first indication and/or the second indication with high efficiency. The RRC signaling and the MAC-layer signaling transmit the first indication and/or the second indication with high flexibility.

In some examples, as shown in FIG. 4, the method further includes step S140.

Step S140 includes receiving the recording information sent based on the second indication.

After receiving the second indication from the base station, the UE may report the recording information based on the second indication. In this way, the base station may receive the recording information.

In some examples, the second indication may further be resource scheduling information. The resource scheduling information indicates a time-domain resource and a frequency-domain resource used to report the recording information by the UE. In this way, the UE may send the recording information on the time-domain resource and the frequency-domain resource indicated by the second indication.

In some examples, the second indication is further configured to indicate information content of the to-be-reported recording information by the UE.

In some examples, the UE may record information based on the recording content information. It is possible that the base station does not issue the recording content information. Even if the UE records the information based on the recording content information, the recording information needed by the base station may be different in different cases. In this case, the second indication may further be configured to indicate information content needing to be reported by the UE, such that transmission of unnecessary recording information is reduced.

For example, The UE uploads the recording information by means of a UE Information Response. The UE may upload the recording information in various signaling, for example, various RRC signaling, MAC-layer signaling or other signaling.

In some examples, the method further includes sending an overheating notification of the UE to a base station where the UE resides in during overheating of the UE based on the recording information, where the overheating notification is configured to trigger the base station receiving the overheating notification to adjust radio configuration for the UE.

In the case that the UE currently reports the recording information and an anchor base station used during the overheating of the UE occurs is another base station, the overheating notification is sent to the another base station. For example, in the case that an Xn interface exists between these two base stations, the overheating notification may be transmitted via the Xn interface. In the case that there is no Xn interface between these two base stations, the overheating notification may be transmitted via a backhaul link, etc., In a word, there are various ways for transmitting the overheating notification. The current base station may send the overheating notification to the anchor base station used during the overheating of the UE occurs. Subsequently, in the case that the UE is anchored to a corresponding base station again, the corresponding base station may prevent the UE from overheating by adjusting radio bearer configuration for the UE.

In some examples, the method further includes receiving radio bearer configuration for the UE returned by the corresponding base station based on the overheating notification. After receiving the radio bearer configuration, the current base station may adjust the configuration for the UE appropriately, so as to reduce similar radio bearer configuration causing the overheating of the UE.

The radio bearer configuration includes but is not limited to:
antenna configuration, for example, configured to indicate the number of antennas used by the UE to communicate with the base station;
antenna panel configuration, for example, configured to indicate the number of antenna panels used by the UE to communicate with the base station;
carrier configuration, for example, configured to indicate that the UE uses a single-carrier for communication or a multi-carrier for communication; and
modulation-coding-scheme configuration, for example, configured to reduce the order of a modulation coding scheme of the UE having a phenomenon of overheating or frequent overheating.

In an example, in the case that the base station receives the recording information and finds that the anchor base station of the UE is the base station itself during the temperature abnormality such as the overheating of the UE occurs, the base station does not need to send the overheating notification to other base stations.

In an example, in the case that the UE uses multi-antenna, multi-antenna panel, or multi-carrier for communication, the UE may generate a large amount of computation and a large amount of heat in a short time as compared to use the single-carrier, single-antenna panel, and single-antenna for communication, causing the temperature of the UE rises sharply, and even causing a phenomenon of overheating.

According to the examples of the present disclosure, there is provided an information processing method. The thermal measurement configuration is issued by the base station to prevent the UE from temperature abnormalities such as the overheating.

The method according to the examples of the disclosure may be used to prevent the overheating of the UE. The base station configures the MDT configuration for the overheating of the UE during the UE is in the connected state, configures the measurement behavior for idle-state UE via the RRC signaling. The measurement behavior is for collecting information related to the temperature of the UE after the UE enters the idle state. The MDT configuration includes one of the foregoing thermal measurement configuration.

In an example, the RRC signaling may be Logged Measurement Configuration signaling.

In an example, the content of the configuration may include at least one of the following:
start time of the measurement, for example, starting from 11 p.m;
end time of the measurement, for example, ending at 6 a.m;
temperature threshold triggering the UE to record;
moment at which the temperature of the UE exceeds the threshold;
duration during which the temperature of the UE exceeds the threshold;
reason causing the temperature of the UE to exceed the threshold;
business that the UE is performing when the temperature of the UE exceeds the threshold;
moment at which the temperature of the UE exceeds the threshold;
cell where the UE resides in when the temperature of the UE exceeds the threshold; and
RAT that the UE resides when the temperature of the UE exceeds the threshold.

In some cases, the temperature threshold triggering the UE to record may be lower than a value triggering the UE to send the overheating indication to the base station.

The UE in the connected state may receive the signaling. The UE may measure based on the configuration of the base station and store the measurement result, after the UE enters the idle state.

For example, the base station configures the UE to measure and record in response to the temperature of the UE exceeding 30° during the time period of 8 a.m. to 11 μm. In this case, after entering the idle state, the UE starts to measure and record an event that the UE exceeds 30° during 8 a.m. to 11 p.m.

For example, the temperature of the UE exceeds 30° due to usage of certain APP at 12 o'clock.

In a subsequent process of establishing a connection with the base station to enter the connected state, the UE may indicate, via the RRC signaling, to the base station that the UE has MDT information related to the overheating measured in the idle state. In a 4G network, the RRC signaling may be added to RRC Connection Setup Complete signaling, RRC Connection Reconfiguration Complete signaling, RRC Connection Reestablishment Complete signaling, and RRC Connection Resume Complete signaling.

In a 5G network, the signaling may be added to RRC Setup Complete signaling, RRC Reconfiguration Complete signaling, RRC Reestablishment Complete signaling, and RRC Resume Complete signaling.

After receiving the indication from the UE, the base station may indicate, based on needs of the base station itself and via the RRC signaling, the UE to report the MDT information related to the overheating and needed by the base station, and the RRC signaling may be added to UE InformationRequest signaling. The MDT information includes the foregoing recording information.

After receiving the indication from the base station, the UE reports the MDT information based on the needs of the base station. The reporting information may be transmitted via UE Information Response signaling.

After receiving reporting of the MDT information related to the overheating from the UE, the base station may inform a base station associated with the UE whose temperature exceeds the temperature threshold of the time during which the overheating of the UE occurs.

After receiving the information, a target base station avoids configuring high-configuration radio configuration for the UE at that time, so as to avoid overheating the UE.

Figure 6:
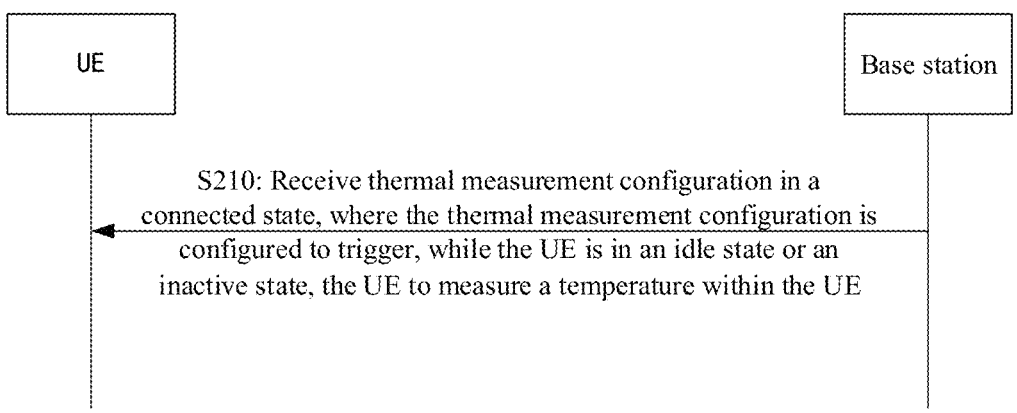
FIG. 6 is a schematic flowchart of an information processing method according to an example.

As shown in FIG. 6, an example of the present disclosure provides an information processing method. The method includes step S210.

Step S210 includes receiving thermal measurement configuration in a connected state, where the thermal measurement configuration is configured to trigger, while the UE is in an idle state or an inactive state, the UE to measure a temperature within the UE.

The UE receives the thermal measurement configuration sent by a base station and stores the thermal measurement configuration, while the UE is in the connected state. After the UE enters the inactive state and/or the idle state, the UE may measure and/or record its own temperature based on the thermal measurement configuration.

In some examples, the thermal measurement configuration includes at least one of the following:
measurement time information, configured to indicate time for measuring the UE;
recording triggering information, configured to trigger the UE to record the measured temperature;
recording content information, configured to indicate content needing to be recorded by the UE; and
reporting triggering information, configured to trigger the UE to report the recorded information.

In some examples, one or more of the measurement time information, the recording triggering information, the recording content information, and the reporting triggering information are carried in the thermal measurement configuration. In this way, after receiving the thermal measurement configuration, the UE may measure the temperature based on one or more items of information carried in the thermal measurement configuration.

In some examples, the method further includes:
measuring the temperature of the UE based on the thermal measurement configuration after the UE exit the connected state and enter the inactive state or the idle state; and
recording, based on the recording triggering information and the measured temperature, recording content indicated by the recording content information to form recording information.

In some examples, after the UE receives the thermal measurement configuration, the UE may perform measurement based on the thermal measurement configuration after entering the idle state or the inactive state.

The recording information is generated based on the recording triggering information and the measured temperature. Specific recording content may be determined based on the recording content information.

In some examples, measuring the temperature of the UE based on the thermal measurement configuration after the UE exit the connected state and enter the inactive state or the idle state, includes: measuring the temperature of the UE during a measurement time indicated by the measurement time information after the UE exit the connected state and enter the inactive state or the idle state.

Measuring and recording of the temperature during peak usage periods of the UE may aggravate a load of the UE. For this purpose, the measurement may be performed at corresponding time indicated by the measurement time information.

In an example of the present disclosure, a measurement time period indicated by the measurement time information may be a time period during which communication load rate, entertainment load rate, and/or other load rates of the UE is relatively low.

In an example of the present disclosures, not only the state in which the UE measures the temperature is limited, but also the time period during which the UE measures the temperature is limited. In this way, unnecessary measurement of the UE is reduced, such that power consumption of the UE is lowered, a standby duration of the UE is prolonged.

In some examples, the method further includes reporting the recording information based on the reporting triggering information.

In an example of the present disclosure, the UE is allowed to report the recording information after a reporting triggering condition is satisfied. The UE may report in the case that the base station allows reporting, otherwise the UE may not report. In this way, reporting of unnecessary information is reduced.

In some examples, reporting the recording information based on the reporting triggering information includes carrying a first indication in RRC signaling during the UE enters the connected state, where the first indication is configured to indicate that the UE has the to-be-reported recording information determined based on the reporting triggering information.

Instead of reporting the recording information directly in response to the triggering condition specified by the reporting triggering information being met, the reporting needs to be further allowed by the base station. In this case, the first indication may be carried in the RRC signaling during the UE enters the connected state. The first indication is equivalent to informing the base station that the UE has the recording information meeting the reporting triggering condition and requesting the base station to indicate whether the reporting is allowed.

In some examples, the method further includes:
receiving a second indication issued based on the first indication; and
reporting the to-be-reported recording information based on the second indication.

In the case that the base station allows reporting, the UE may receive the second indication indicating that the reporting is allowed. In this way, the UE may report in response to receiving the second indication.

In the case that the base station prohibits the UE from reporting currently, the base station does not issue the second indication which indicates that the reporting is allowed, or the base station issues the second indication which indicates that the reporting is prohibited. In this way, the UE may not report the to-be-reported recording information.

In some examples, the method further includes adjusting, based on the recording information reported by the UE, multiple input multiple output (MIMO) configuration and/or modulation coding scheme (MCS) configuration for the UE. For example, in the case that the overheating occurs or frequently occurs on the UE, usage frequency of the MIMO by the UE is reduced and/or orders of MCS used by the UE is lowered.

Figure 7:
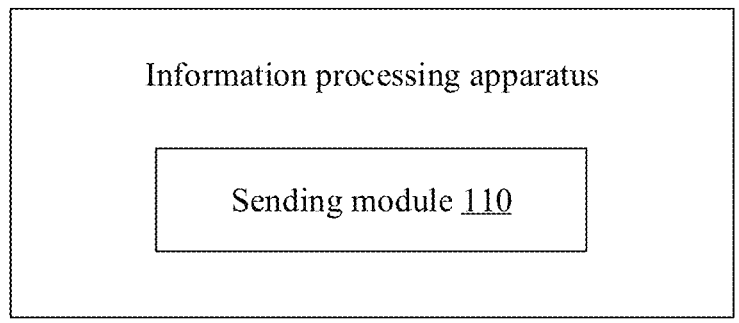
FIG. 7 is a schematic structural diagram of an information processing apparatus according to an example.

As shown in FIG. 7, an example of the present disclosure provides an information processing apparatus. The information processing apparatus includes a sending module 110.

The sending module 110 is configured to send, to a user equipment (UE) in a connected state, thermal measurement configuration, where the thermal measurement configuration is configured to trigger, while the UE is in an idle state or an inactive state, the UE to measure a temperature within the UE.

In some examples, the sending module 110 may be a program module. After the program module is executed by a processor, the thermal measurement configuration may be sent to the UE in the connected state. The connected state is a shortened form of an RRC connected state.

In some examples, the sending module 110 may be a software-hardware combination module. The software-hardware combination module includes, but is not limited to, a programmable array. The programmable array includes, but is not limited to, a complex programmable array or a field programmable array.

In some examples, the sending module 110 further includes a pure hardware module. The pure hardware module includes, but is not limited to, an application specific integrated circuit.

In some examples, the thermal measurement configuration is a kind of Minimized Road Test configuration.

In some examples, sending, to the UE in the connected state, the thermal measurement configuration, includes: sending, to the UE in the connected state, radio resource control (RRC) signaling carrying the thermal measurement configuration.

In some examples, the thermal measurement configuration includes at least one of the following:
  measurement time information, configured to indicate time for measuring the UE;
  recording triggering information, configured to trigger the UE to record the measured temperature;
  recording content information, configured to indicate content needing to be recorded by the UE; and
  reporting triggering information, configured to trigger the UE to report the recorded information.

In some examples, the measurement time information is configured to indicate at least one of the following:
  start and end time of the measurement;
  start time and duration of the measurement.

In some examples, the recording triggering information includes a recording threshold. The recording threshold is configured to trigger, in response to the measured temperature exceeding the recording threshold, the UE to perform information recording.

In some examples, the reporting triggering information includes a reporting threshold. The reporting threshold is configured to trigger, in response to the measured temperature exceeding the reporting threshold, the UE to report the recorded information, where the reporting threshold is greater than the recording threshold.

In some examples, the recording content information is configured to indicate to record at least one of the following:
  moment at which the measured temperature exceeds the recording threshold;
  duration during which the measured temperature exceeds the recording threshold;
  reason why the measured temperature exceeds the recording threshold;
  business service provided by the UE while the measured temperature exceeds the recording threshold;
  cell where the UE resides in while the measured temperature exceeds the recording threshold; and
  radio access technology (RAT) that the UE resides while the measured temperature exceeds the recording threshold.

In some examples, the apparatus further includes: a transmission module, configured to receive RRC signaling carrying a first indication during a switching of the UE to the connected state, in response to the UE determining to exit the inactive state or the idle state and enter the connected stat, where the first indication is configured to indicate to-be-reported recording information in the UE.

In some examples, the apparatus further includes the sending module 110, configured to send a second indication to the UE based on the first indication, where the second indication is configured to indicate to the UE to report the to-be-reported recording information.

In some examples, the second indication is further configured to indicate information content of the to-be-reported recording information by the UE.

In some examples, the apparatus further includes the transmission module, configured to receive the recording information sent based on the second indication.

In some examples, the apparatus further includes the sending module 110, further configured to send an overheating notification of the UE to a base station where the UE resides during overheating of the UE based on the recording information, where the overheating notification is configured to trigger the base station receiving the overheating notification to adjust radio configuration for the UE.

Figure 8:
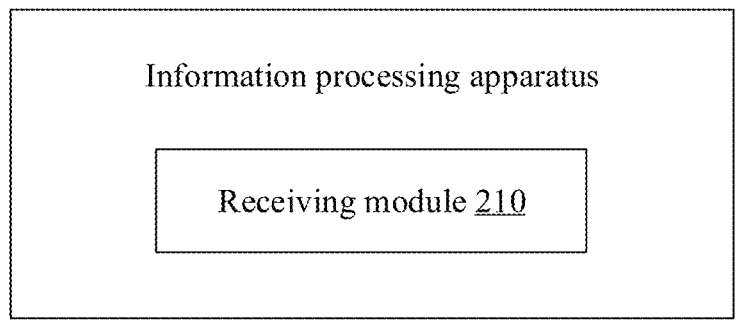
FIG. 8 is a schematic structural diagram of an information processing apparatus according to an example.

As shown in FIG. 8, an example of the present disclosure provides an information processing apparatus. The information processing apparatus includes a receiving module 210, configured to receive thermal measurement configuration in a connected state, where the thermal measurement configuration is configured to trigger, while the UE is in an idle state or an inactive state, the UE to measure a temperature within the UE.

In some examples, the receiving module 210 may be a program module. After executed by a processor, the program module may receive the thermal measurement configuration in the connected state. The connected state is a shortened form of an RRC connected state.

In some examples, the receiving module 210 may be a software-hardware combination module. The software-hardware combination module includes, but is not limited to, a programmable array. The programmable array includes, but is not limited to, a complex programmable array or a field programmable array.

In some examples, the receiving module 210 further includes a pure hardware module. The pure hardware module includes, but is not limited to, an application specific integrated circuit.

In some examples, the thermal measurement configuration includes at least one of the following:
measurement time information, configured to indicate time for measuring the UE;
recording triggering information, configured to trigger the UE to record the measured temperature;
recording content information, configured to indicate content needing to be recorded by the UE; and
reporting triggering information, configured to trigger the UE to report the recorded information.

In some examples, the apparatus further includes: a measurement module, configure to measure the temperature of the UE based on the thermal measurement configuration after the UE exit the connected state and enter the inactive state or the idle state; and a recording module, configured to record, based on the recording triggering information and the measured temperature, recording content indicated by the recording content information to form recording information.

In some examples, the measurement module is configured to measure the temperature of the UE during a measurement time indicated by the measurement time information after the UE exit the connected state and enter the inactive state or the idle state.

In some examples, the apparatus further includes: a reporting module, configured to report the recording information based on the reporting triggering information.

In some examples, the reporting module is configured to carry a first indication in RRC signaling during the UE enters the connected state, where the first indication is configured to indicate that the UE has the to-be-reported recording information determined based on the reporting triggering information.

In some examples, the receiving module 210 is further configured to receive a second indication issued based on the first indication; and the reporting module is configured to report the to-be-reported recording information based on the second indication.

An example of the present disclosure provides a communication device, including a processor, a transceiver, a memory, and executable programs. The executable programs are stored in the memory and may be executed by the processor. While executing the executable programs, the processor performs the information processing method applied to UE and provided by any foregoing technical solutions, or performs the information processing method applied to the base station and provided by any foregoing technical solutions, for example, the information processing method shown in FIGS. 2 to 6.

The communication device may be the foregoing base station or the UE.

The processor may include various types of storage mediums. The storage medium is a non-transitory computer storage medium and can continue to memorize the information stored in the storage medium after the communication device is powered down. The communication device includes a base station or a user equipment.

The processor may be connected to the memory by means of a bus and the like, and is configured to read the executable programs stored on the memory, for example, at least one of FIGS. 2 to 6.

An example of the present disclosure provides a non-transitory computer storage medium storing executable programs. After executed by a processor, the executable programs can implement the method shown in any technical solutions according the first aspect or the second aspect, for example, at least one of FIGS. 2 to 6.

According to the technical solutions of the disclosure, a base station may send thermal measurement configuration to a UE in a connected state, and the thermal measurement configuration may be configured to trigger, while the UE is in an inactive state or an idle state, the UE to measure and record a temperature within the UE. After the UE reports recording information formed by the measurement to the base station, the base station may know when or under what conditions temperature abnormalities may occur on the UE, so as to adjust resource configuration and/or service scheduling for the UE in a targeted manner. In this way, temperature abnormalities of the UE such as overheating is reduced, usage life of the UE is prolonged, and user experience is improved.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Those skilled in the art would readily conceive of other implementations of the present disclosure after considering the specification and practicing the examples disclosed. The present disclosure is intended to cover any variations, uses or adaptive changes of the present disclosure. These variations, uses or adaptive changes follow the general principle of the present disclosure and include common general knowledge or conventional technical means in the technical field that are not disclosed in the present disclosure. The description and the examples are regarded as examples, and the real scope and spirit of the disclosure are pointed out by the following claims.

It should be understood that the present disclosure is not limited to the precise structure described above and shown in the figures, and various modifications and changes can be made without departing from its scope.

What is claimed is:

1. An information processing method, comprising:
sending a thermal measurement configuration, to a user equipment (UE) while the UE is in a connected state, wherein the thermal measurement configuration is configured to trigger the UE to measure, while the UE is in an idle state or an inactive state, a temperature within the UE;

wherein the thermal measurement configuration comprises:

recording triggering information comprising a recording threshold, wherein the recording threshold is configured to trigger, in response to the measured temperature exceeding the recording threshold, the UE to perform information recording; and reporting triggering information comprising a reporting threshold, wherein the reporting threshold is configured to trigger, in response to the measured temperature exceeding the reporting threshold, the UE to report the recorded information;

wherein the reporting threshold is greater than the recording threshold.

2. The method according to claim 1, wherein the thermal measurement configuration is Minimized Road Test configuration.

3. The method according to claim 1, wherein sending the thermal measurement configuration, to the UE while the UE is in the connected state, comprises:

sending radio resource control (RRC) signaling carrying the thermal measurement configuration to the UE while the UE is in the connected state.

4. The method according to claim 1, wherein the thermal measurement configuration further comprises at least one of the following:

measurement time information, configured to indicate time for measuring the UE; or recording content information, configured to indicate content needing to be recorded by the UE.

5. The method according to claim 4, wherein the measurement time information is configured to indicate:

start and end time of the measurement; or start time and duration of the measurement.

6. The method according to claim 4, wherein the recording content information is configured to indicate to record at least one of the following:

moment at which the measured temperature exceeds the recording threshold;

duration during which the measured temperature exceeds the recording threshold;

reason why the measured temperature exceeds the recording threshold;

business service provided by the UE while the measured temperature exceeds the recording threshold;

cell where the UE resides in while the measured temperature exceeds the recording threshold; or radio access technology (RAT) that the UE resides while the measured temperature exceeds the recording threshold.

7. The method according to claim 1, further comprising:

receiving radio resource control (RRC) signaling carrying a first indication, during a switching of the UE to the connected state in a case where the UE determines to exit the inactive state or the idle state and to enter the connected state, wherein the first indication is configured to indicate that there is to-be-reported recording information in the UE.

8. The method according to claim 7, further comprising:

sending a second indication to the UE based on the first indication, wherein the second indication is configured to indicate to the UE to report the to-be-reported recording information.

9. The method according to claim 7, further comprising:

sending an overheating notification of the UE to a base station where the UE resides in during overheating of the UE based on the recording information, wherein the overheating notification is configured to trigger the base station receiving the overheating notification to adjust radio configuration for the UE.

10. A non-transitory computer-readable storage medium storing executable programs, wherein the executable programs, when executed by one or more processors, implement the method according to claim 1.

11. An information processing method, comprising:

receiving, by a user equipment (UE), thermal measurement configuration while the UE is in a connected state, wherein the thermal measurement configuration is configured to trigger the UE to measure, while the UE is in an idle state or an inactive state, a temperature within the UE;

wherein the thermal measurement configuration comprises:

recording triggering information comprising a recording threshold, wherein the recording threshold is configured to trigger, in response to the measured temperature exceeding the recording threshold, the UE to perform information recording; and reporting triggering information comprising a reporting threshold, wherein the reporting threshold is configured to trigger, in response to the measured temperature exceeding the reporting threshold, the UE to report the recorded information;

wherein the reporting threshold is greater than the recording threshold.

12. The method according to claim 11, wherein the thermal measurement configuration further comprises at least one of the following:

measurement time information, configured to indicate time for measuring the UE; or recording content information, configured to indicate content needing to be recorded by the UE.

13. The method according to claim 12, further comprising:

measuring the temperature of the UE based on the thermal measurement configuration after the UE exits the connected state and enters the inactive state or the idle state; and recording, based on the recording triggering information and the measured temperature, recording content indicated by the recording content information to form recording information.

14. The method according to claim 13, wherein measuring the temperature of the UE based on the thermal measurement configuration after the UE exits the connected state and enters the inactive state or the idle state comprises:

measuring the temperature of the UE during a measurement time indicated by the measurement time information after the UE exits the connected state and enters the inactive state or the idle state.

15. The method according to claim 14, further comprising:

comprising a first indication in radio resource control (RRC) signaling when the UE enters the connected state, wherein the first indication is configured to indicate that the UE has to-be-reported recording information determined based on the reporting triggering information.

16. The method according to claim 15, further comprising:
- receiving a second indication issued based on the first indication; and
- reporting the to-be-reported recording information based on the second indication.

17. A communication device, comprising one or more processors, a transceiver, a memory, and executable programs, wherein the executable programs are stored in the memory and are executed by the one or more processors, and when the one or more processors executes the executable programs, the method according to claim 11 is performed.

18. A non-transitory computer-readable storage medium storing executable programs, wherein the executable programs, when executed by a one or more processors, implement the method according to claim 11.

19. A communication device, comprising a one or more processors, a transceiver, a memory, and executable programs, wherein the executable programs are stored in the memory and are collectively executed by the one or more processors, and when the one or more processors collectively executes the executable programs, the one or more processors is are collectively configured to send a thermal measurement configuration, to a user equipment (UE) while the UE is in a connected state, wherein the thermal measurement configuration is configured to trigger the UE to measure, while the UE is in an idle state or an inactive state, a temperature within the UE;

wherein the thermal measurement configuration comprises:

recording triggering information comprising a recording threshold, wherein the recording threshold is configured to trigger, in response to the measured temperature exceeding the recording threshold, the UE to perform information recording; and reporting triggering information comprising a reporting threshold, wherein the reporting threshold is configured to trigger, in response to the measured temperature exceeding the reporting threshold, the UE to report the recorded information;

wherein the reporting threshold is greater than the recording threshold.

* * * * *